May 11, 1943.  C. A. NICHOLS ET AL  2,318,707
MANUFACTURE OF TEES FROM METAL TUBING
Filed March 27, 1941  2 Sheets-Sheet 1
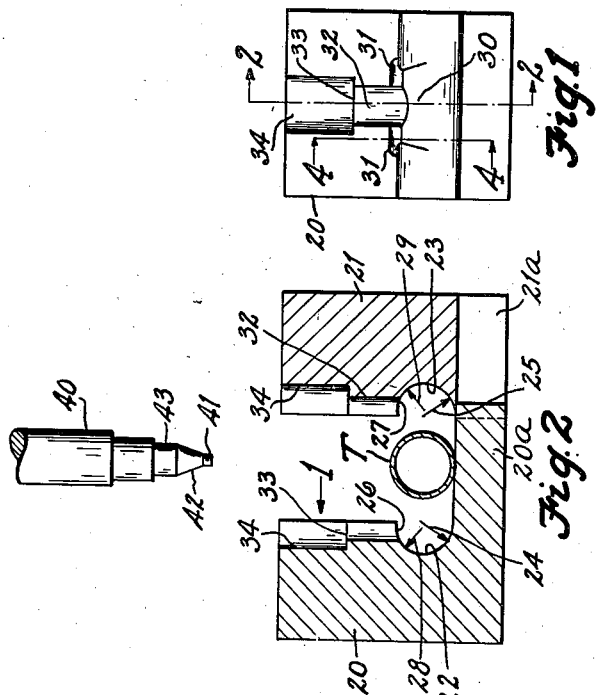
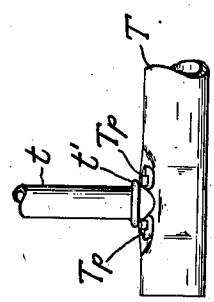
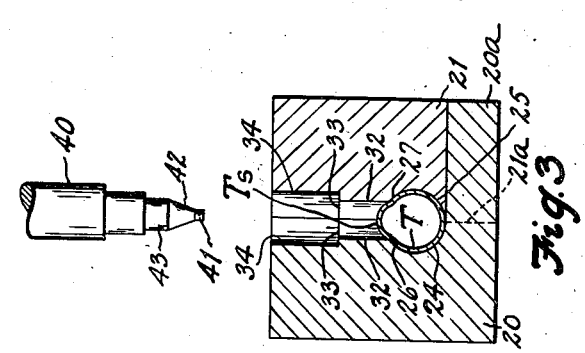
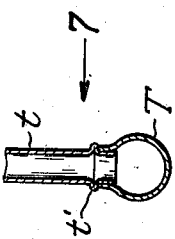
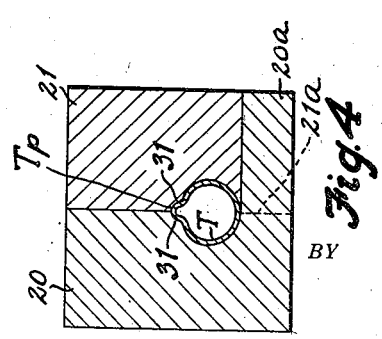
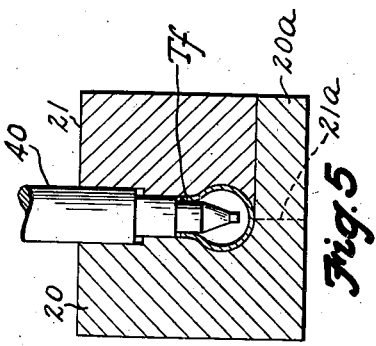
INVENTOR
CHARLES A. NICHOLS
GEORGE L. WEISER
BY
Their ATTORNEYS

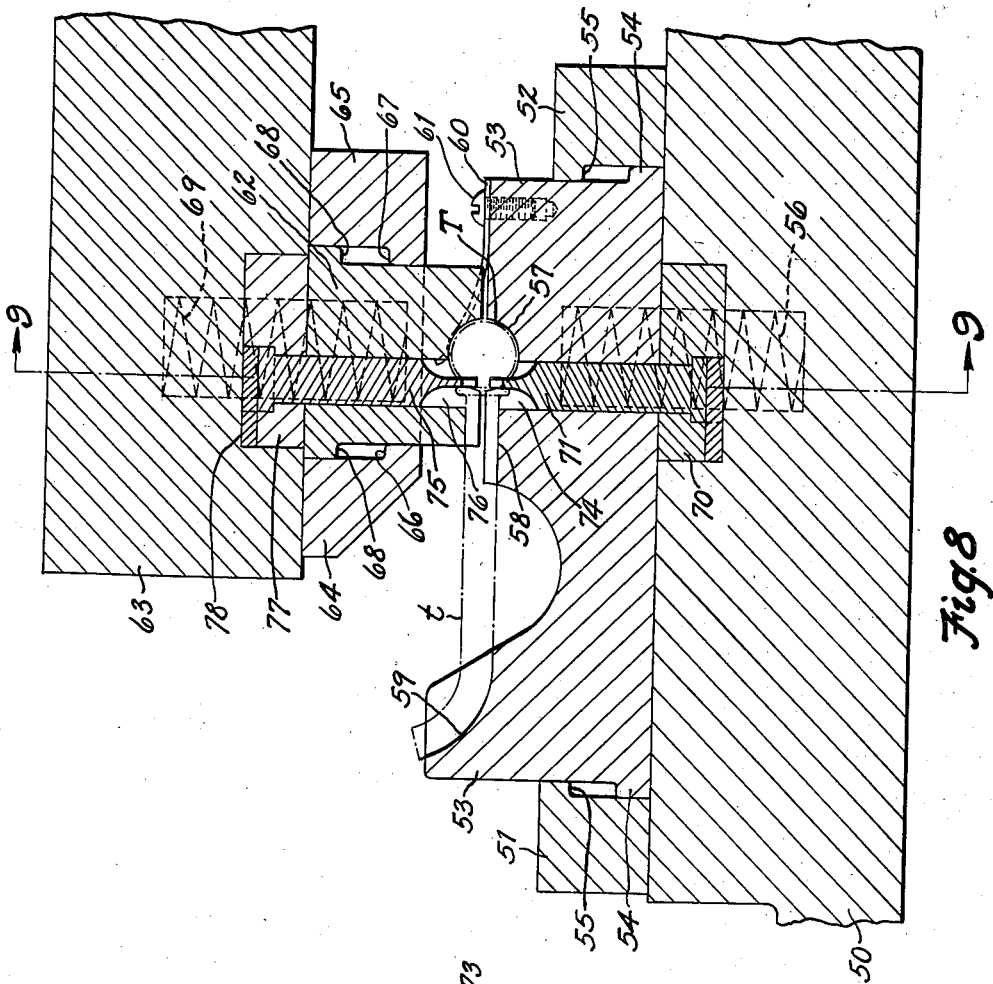
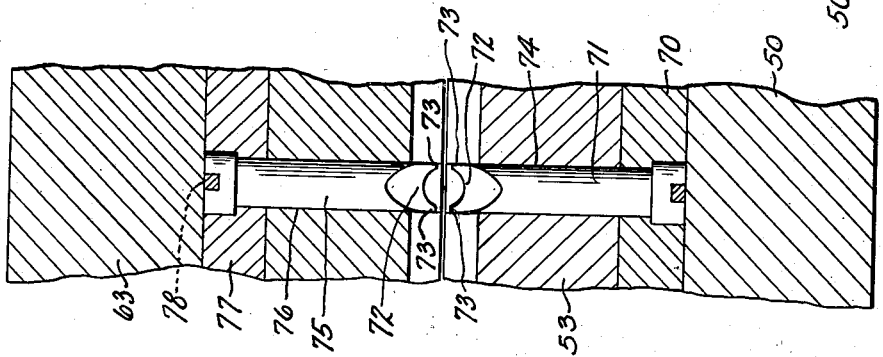

Patented May 11, 1943

2,318,707

UNITED STATES PATENT OFFICE 2,318,707

MANUFACTURE OF T'S FROM METAL TUBING

Charles A. Nichols and George L. Weiser, Anderson, Ind., assignors to General Motors Corporation, Detroit, Mich., a corporation of Delaware Application March 27, 1941, Serial No. 385,518

4 Claims. (Cl. 29—157)

This invention relates to the fabrication of articles made of metal tubing, for example the oil distributing manifold for the crank shaft bearings of an internal combustion engine.

It is an object of the invention to provide a T made solely of two pieces of sheet metal tube, one of them being provided with a side outlet providing a socket for receiving the other pieces of tube. In accomplishing this object we provide a novel method for forming a side opening in the wall of one of the pieces of tube. The first step is to squeeze a portion of the tube between dies which are so shaped that a portion of the side wall is pinched or creased to provide a portion which has an exterior surface which is spherically convex. The next step is to force a punch through this spherically convex portion of the tubing while the tubing remains confined between the shaping blocks. The punch is made of hardened metal and is carefully polished and chrome-plated. Its tapered lower end enters the spherical surface and punches out a hole. While the tubing is confined between the forming blocks this spherical surface is maintained so rigid as to withstand the punch without pushing the metal of the spherical portion inwardly. When a hole is started in this spherical portion the tapered part of the punch flares the hole in such fashion as to form an annular flange extending outwardly, thus defining a socket for the reception of another piece of tubing.

Further objects and advantages of the present invention will be apparent from the following description, reference being had to the accompanying drawings, wherein a preferred embodiment of the invention is clearly shown.

In the drawings:

Fig. 1 is a side elevation of one of the tube forming die blocks shown in Fig. 2. Fig. 1 is a view in the direction of arrow 1 of Fig. 2.

Fig. 2 is a cross sectional view of the two die blocks when separated and before engaging a tube. Fig. 2 is a sectional view on the line 2—2 of Fig. 1. Fig. 2 includes also a fragmentary side view of the piercing punch.

Fig. 3 is a view similar to Fig. 2 showing the shaping of the tube by the forming die blocks. Fig. 3 is a sectional view on the line 2—2 of Fig. 1.

Fig. 4 is a cross sectional view taken on the line 4—4 of Fig. 1 showing the formation of the tubing adjacent to and on both sides of the spherical convex portion of the tube as shown in Fig. 3.

Fig. 5 is a view similar to Fig. 3 showing the piercing and flange flaring punch in downward position.

Fig. 6 is a sectional view showing the piece of tubing shown in Fig. 5 assembled with another piece of tubing extending at right angles to the first piece.

Fig. 7 is a side view in the direction of arrow 7 of Fig. 6.

Fig. 8 is a sectional view of apparatus for deforming portions of the larger tube around a portion of the smaller tube shown in Fig. 7.

Fig. 9 is a sectional view on the line 9—9 of Fig. 8.

Referring to Fig. 2, a tube T is located between die blocks 20 and 21 providing semi-cylindrical surfaces 22 and 23 having radii equal to the radii of the outside surface of the tube T as indicated by the arrows 24 and 25. The surfaces 22 and 23 merge into cylindrical surfaces 26 and 27 having radii represented by the arrows 28 and 29 which are less than the radii 24 and 25. The surface of block 20 (Fig. 1) having the radius 28 is indicated by numeral 30 in Fig. 1. Just above the surface 30 there is a shallow groove 31 interrupted by a semi-cylindrical groove 32. Groove 32 extends to a step 33 which steps off to a semi-cylindrical groove 34 of greater radius than groove 32. The block 21 is provided with similar surfaces 32, 33 and 34. Block 20 includes parts 20a engaging grooves 21a of part 21.

When the dies 20 and 21 are separated as shown in Fig. 2, a section of tubing T is placed upon the parts 20a. Then the dies 20 and 21 are moved together to cause the tube to take the form shown in Fig. 3. The portions 26 and 27 of the dies 20 and 21 deform the tube T and cause a spherically convex portion Ts to be formed. This portion in effect lies up like a blister within the space defined by the two cylindrical grooves 32. The portions of the tube immediately adjacent to and on diametrically opposite sides of the portion Ts are formed as shown in Fig. 4 by the surface defining the grooves 31. These pinched portions of the tube T are marked Tp.

While the tube T is thus confined between the dies 20 and 21, the second operation is performed. This comprises forcing the punch 40 downwardly through the opening defined by the cylindrical grooves 34 and 32. Punch 40 has a lower end portion 41 for piercing a hole in the blister-like spherical part Ts and a tapered portion 42 for spreading the metal surrounding the hole formed by portion 41 and for causing the spread metal to form an upwardly extending annular flange T*f* shown in Fig. 5, said flange being trued by portion 43 of punch 40.

The operating surface of punch 40 should be carefully polished and chrome-plated in order to secure best results.

Following the operations performed by the dies 20 and 21 and the punch 40, the tube T is ready to receive a branch connection *t* of such diameter as to be snugly received within the socket provided by the annular flange T*f*. The tube section *t* has an annular flange *t'* for engaging the outer edge surface of the flange T*f*. After the assembly shown in Fig. 6 has been made, the portions T*p* of tube T are deformed so as to squeeze the flange T*f* more firmly around the tube *t*. The apparatus for performing the operation shown in Fig. 7 is illustrated in Figs. 8 and 9. A punch press bed 50 supports bars 51 and 52 which are spaced apart to receive a yieldably mounted work-holder block 53 having flanges 54 adapted to engage flanges 55 of bars 51 and 52 when said block 53 is permitted to move upwardly under the action of springs 56. Block 53 is provided with a cylindrical groove 57 for receiving tube T with a groove 58 for receiving a straight portion of the tube *t* and a curved groove 59 for receiving a curved portion of the tube *t*. A spring clip 60 attached by screw 61 to block 53 tends to retain the tubes T and *t* in the position shown in Fig. 8 until said tubes are engaged by an upper pressure block 62 yieldably supported by the upper head 63 of a punch press. Block 62 is guided by bars 64 and 65 having branches 66 and 67 for receiving branches 68 of pressure block 62 when said head 63 is moved upwardly to permit springs 69 to urge the block 62 downwardly.

Bed 50 is recessed to receive a block 70 for receiving the lower end of a stationary punch 71, the upper end of which is shaped to provide an arcuate edge 72 embracing a part of the flange T*f* of tube T and with punches 73 for engaging the pinched portions T*p* (Fig. 4 and Fig. 7) of the tube T. Punch 71 extends through a hole 74 in workholder block 53. A similarly shaped punch 75 extending through a hole 76 in pressure block 62 is secured at its upper end to a block 77 received by a recess 78 in block 63.

The apparatus shown in Fig. 8 causes the assembled tube parts T*t* to be yieldingly clamped in assembled relation as shown in Fig. 8 while deformed punches 71 and 75 engage the pinched portion T*p* of tube T thereby causing the flange T*f* firmly to grip the lower end of the small tube *t*. The T thus formed by the tube parts T*t* is removed from the apparatus shown in Figs. 8 and 9 and the joint between these sections is sealed by soldering.

While the embodiment of the present invention as herein disclosed constitutes a preferred form, it is to be understood that other forms might be adopted, all coming within the scope of the claims which follow.

What is claimed is as follows:

1. The method of forming a flanged side opening in a piece of metal tubing preparatory to forming a T which comprises inwardly deforming the tubing to form two spaced crimped portions in longitudinal alignment and an intermediate outwardly bulged portion, forming a hole in the bulge and forming the metal of the bulge which surrounds the hole into an outwardly extending annular flange.

2. The method of forming a flanged side opening in a piece of metal tubing preparatory to forming a T which comprises subjecting the tube to the action of dies so shaped as to force portions of the side wall of the tube inwardly and to provide for the movement of the displaced metal outwardly in order to form two longitudinally aligned crimped portions and an intermediate bulged portion, and, while the tube is confined between the dies, forming a hole in the bulge and subjecting the bulge externally to the action of a hole enlarging tool which forms an outwardly projecting flange around the hole.

3. The method of forming a flanged side opening in a piece of metal tubing preparatory to forming a T which comprises subjecting the tube to the action of dies so shaped as to force portions of the side wall of the tube inwardly and to provide for the movement of the displaced metal outwardly in order to form two longitudinally aligned crimped portions and an intermediate bulged portion, and, while the tube is confined between the dies, subjecting the bulge to the action of a hole piercing the hole enlarging punch having a cylindrical hole-piercing end portion merging into a conically tapered hole-enlarging and flange forming portion.

4. The method of making a T of pieces of metal tubing of different sizes which comprises subjecting the tube of greater diameter to the action of two dies so shaped as to force portions of the side wall of the tube inwardly and to provide for the movement of the displaced metal outwardly to form two longitudinally aligned crimped portions merging with an outwardly bulging portion, forming a hole in said bulge, and forming the metal of the bulge which surrounds the hole into an outwardly extending annular flange, thereby enlarging the hole so as to receive the piece of tubing of lesser diameter, in placing an end of the smaller tube within the flange of the larger tube and in securing the tubes together, by additionally compressing the crimped portions of the larger tube so as to squeeze the flange thereof around the smaller tube.

CHARLES A. NICHOLS.
GEORGE L. WEISER.